United States Patent [19]

Conner

[11] 4,456,288
[45] Jun. 26, 1984

[54] SNAP RING AND RESTRAINED PIPE JOINT USING SAID SNAP-RING

[75] Inventor: Randall C. Conner, Birmingham, Ala.

[73] Assignee: American Cast Iron Pipe Company, Birmingham, Ala.

[21] Appl. No.: 390,881

[22] Filed: Jun. 22, 1982

Related U.S. Application Data

[63] Continuation-in-part of Ser. No. 242,925, Mar. 12, 1981.

[51] Int. Cl.³ .............................................. F16L 21/08
[52] U.S. Cl. ..................................... 285/321; 285/374
[58] Field of Search ....................... 285/374, 337, 321

[56] References Cited

U.S. PATENT DOCUMENTS

| 1,873,621 | 8/1932 | Moore . | |
|---|---|---|---|
| 2,009,650 | 7/1935 | Claussen et al. . | |
| 2,097,628 | 11/1937 | Liebhardt . | |
| 2,441,344 | 5/1948 | Bosworth | 285/321 |
| 2,774,617 | 12/1956 | Lanninger . | |
| 2,806,717 | 9/1957 | Hempel . | |
| 2,877,732 | 3/1959 | Eaton | 285/321 X |
| 2,883,083 | 4/1959 | Terry, Jr. et al. | 285/309 X |
| 2,991,092 | 7/1961 | MacKay . | |
| 3,167,331 | 1/1965 | Marshall | 285/321 X |
| 3,177,019 | 4/1965 | Osweiler . | |
| 3,219,364 | 11/1965 | Wooldridge . | |
| 3,381,983 | 5/1968 | Hanes . | |
| 3,521,911 | 7/1970 | Hanes et al. . | |
| 3,684,320 | 8/1972 | Platzer et al. . | |
| 3,698,744 | 10/1972 | Bevington . | |
| 3,776,576 | 12/1973 | Keyser | 285/321 X |
| 3,884,510 | 5/1975 | Bram | 285/374 X |
| 4,127,290 | 11/1978 | Mutschlechner | 285/104 X |
| 4,296,953 | 10/1981 | Nagao et al. | 285/374 X |

FOREIGN PATENT DOCUMENTS

| 948463 | 8/1956 | Fed. Rep. of Germany . | |
|---|---|---|---|
| 2162435 | 6/1973 | Fed. Rep. of Germany | 285/374 |
| 0106916 | 8/1979 | Japan | 285/374 |
| 0106917 | 8/1979 | Japan | 285/374 |
| 0106918 | 8/1979 | Japan | 285/374 |
| 632049 | 11/1949 | United Kingdom | 285/321 |
| 1077599 | 8/1967 | United Kingdom | 285/321 |

Primary Examiner—Thomas F. Callaghan
Attorney, Agent, or Firm—Kerkam, Stowell, Kondracki & Clarke

[57] ABSTRACT

A pipe joint is locked against separation by a split snap-ring assembly including a ring adjustor outside of the plane of the snap-ring. The snap-ring assembly is especially well suited for use with spigot and socket joints of large diameter pipe. The pipe joint may use an annular gland or collar piece such that relative rotation between the spigot and socket may be allowed thereby minimizing stress.

23 Claims, 8 Drawing Figures

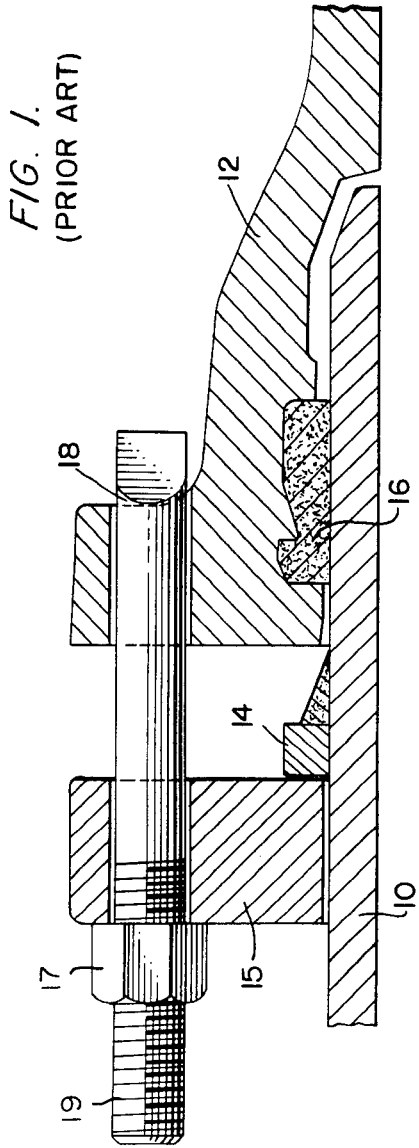
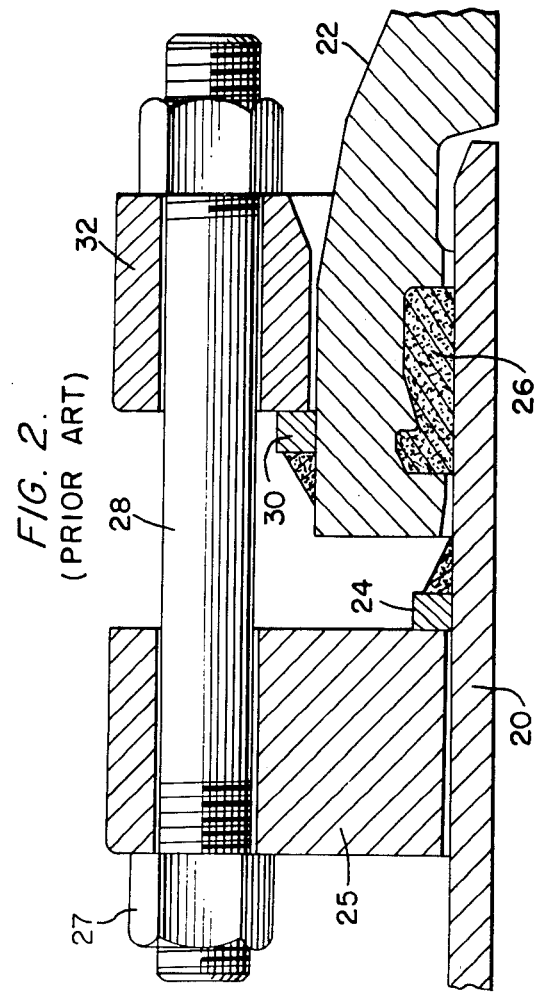

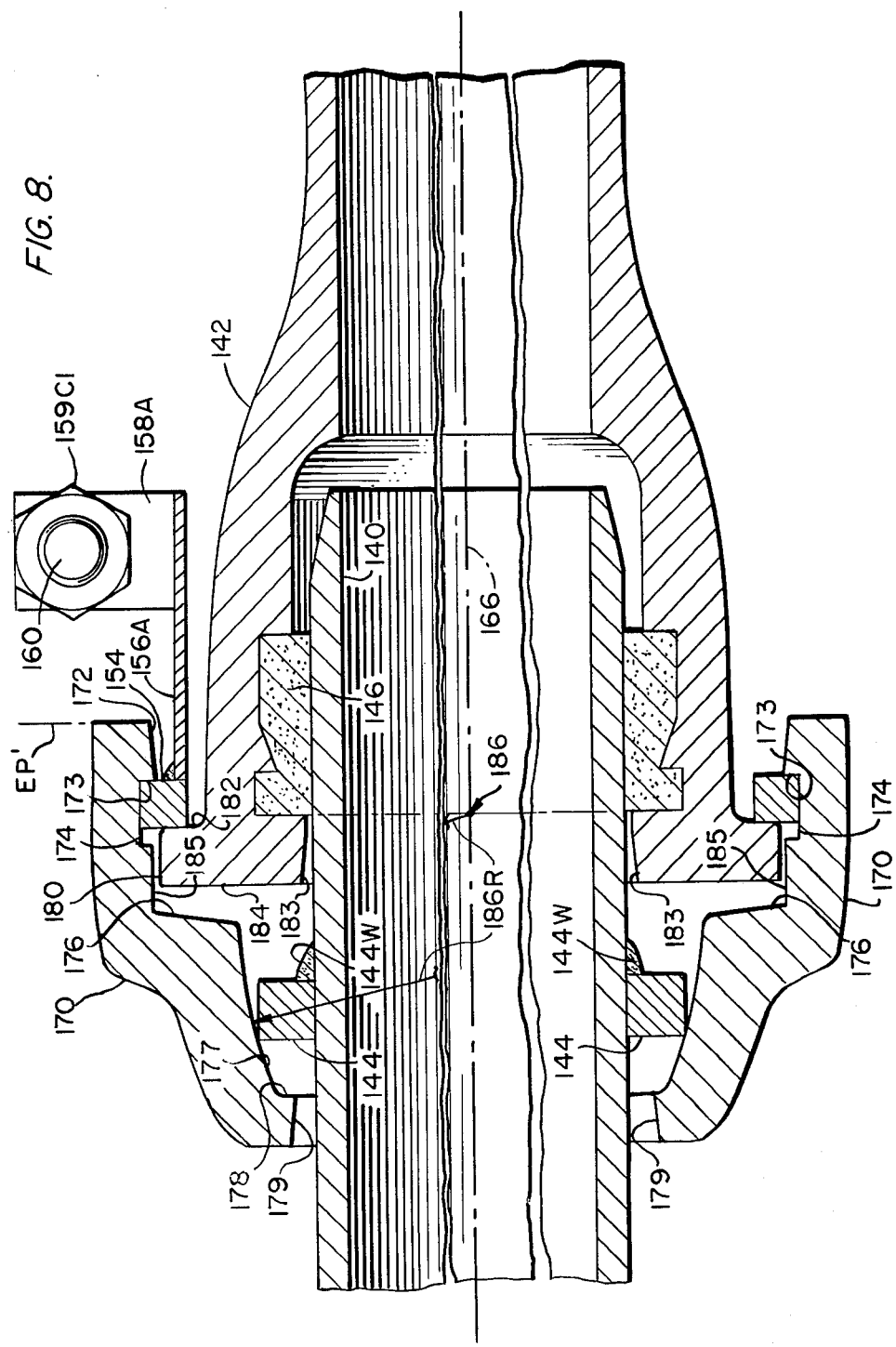

SNAP RING AND RESTRAINED PIPE JOINT USING SAID SNAP-RING

CROSS REFERENCE TO RELATED APPLICATION

This application is a continuation-in-part of the present inventor's U.S. patent application Ser. No. 242,925 for "Restrained Pipe Joint and Associated Snap-Ring", filed Mar. 12, 1981, and assigned to the assignee of the present inventor.

FIELD OF THE INVENTION

The present invention relates to restrained pipe joints and, more specifically, to a pipe joint including a snap ring which prevents axial movement of the bell end of one pipe relative to the spigot end of an attached pipe.

DESCRIPTION OF THE PRIOR ART

The use of pipe joints, couplings and fittings of the socket and spigot type is well known in the art and is shown, in U.S. Pat. No. 2,991,092, issued to Jack W. MacKay on July 4, 1961. The aforementioned MacKay patent, which is assigned to the assignee of the present invention and hereby incorporated by reference, discloses the use of a double sealing gasket for socket and spigot type joints. The simplicity and tightness of the seal in the joint disclosed in the MacKay patent makes this joint useful for a wide variety of applications. As is well known in the art, many such joints are continually subject in use to axial forces which tend to move one pipe away from the adjacent and connecting pipe.

Numerous attempts have been made in the prior art to construct prior joints designed to withstand axial forces. Such pipe joints are often complex in construction and may require extensive modification of the basic socket and spigot ends of the connecting pipes. Often these prior art pipe joints require some form of bolt arrangement designed to clamp one pipe to the adjacent pipe. Such bolt type of pipe joints are generally ill suited for providing angular deflection after assembly between the spigot end of the pipe and the attached socket or bell end of the pipe. It should be noted that it is generally desirable for a pipe joint to accomodate limited angular deflection or pivoting movement between the spigot end of the pipe and the attached socket end of the pipe making up a particular pipe joint.

Another form of restrained pipe joint known in the prior art provides the spigot end of the pipe with a locking collar welded or otherwise attached to it. In such an arrangement, the bell member of the socket pipe is inserted between the locking collar and the spigot end of the pipe itself, whereupon the locking collar is rotated to an angular position relative to the bell member and locked therein such that the bell member may not be axially displaced relative to the locking collar and spigot. Although it is generally advantageous to lessen stresses by allowing some rotation between socket and spigot, this rotation feature may be disadvantageous in certain respects. For example, the tolerance of the socket or bell member must be tightly controlled. If the bell member is too large it may prevent rotation and locking or it may bind on the locking collar of the spigot section making rotation of the locking collar extremely difficult. Alternatively, if the bell member is too small, it will not prevent back rotation of the locking collar, raising the possibility that the repeated application of fluid through the pipe may cause the locked joint to be undone. Thus, this structure must contain some means to prevent unintentional rotation of the locking collar. This structure is usually complex and is less than desirable in strength and cost.

Another form of known restrained pipe joints employs a snap-ring to secure the spigot and socket against separation. Snap-rings have generally required substantial modification to the basic spigot and socket interface, and usually need a slot or window in the socket pipe for allowing adjustment to the snap-ring diameter to lock or unlock the joint. This slot or window is a point of weakening stress concentration and presents a problem in construction. Accessability to the snap-ring also becomes a serious problem. In addition, if the gasket is carried by the spigot member and the snap-ring is carried by the bell member, as is the case in the prior art, the gasket must pass by the snap-ring member during installation. The gasket is thus susceptible and clearly vulnerable to damage in installation.

Accordingly, whereas the prior art has developed numerous techniques for axially restraining pipe joints from separation due to axial forces, the techniques are subject to several disadvantages.

It is therefore an object of the present invention to provide an improved pipe joint locked against separation.

A further object of the present invention is to provide an improved pipe joint allowing for a limited angular displacement between adjacent pipes.

A still further object of the present invention is to provide an improved pipe joint which will permit limited rotation of the socket or bell end pipe relative to the spigot end pipe without causing unlocking of the joint.

Yet another object of the present invention is to provide an improved axially restrained pipe joint wherein the bell end of the pipe is not angularly fixed to the spigot end of the pipe.

Another object of the present invention is to provide an improved snap-ring assembly and associated pipe joint wherein the socket end of a pipe accomodates an adjustable snap-ring assembly.

Yet another object of the present invention is to provide an improved restrained pipe joint having a snap-ring assembly readily accessible from outside the pipe joint.

Still another object of the present invention is to provide for a restrained pipe joint including a socket member with only continuous internal or external annular contours. This pipe joint may include a socket member with no holes, slots, windows, or other discontinuities. In addition, no internal or external locking lugs may be required in the locking collar or socket member.

SUMMARY OF THE INVENTION

The above and other objects of the present invention are accomplished by a pipe joint locked against axial separation by a readily accessible snap-ring assembly. The pipe joint comprises a cylindrical socket, a cylindrical spigot extending into said cylindrical socket and having a spigot outwardly projecting portion fixed to that part of the cylindrical spigot which is within the cylindrical socket, and a gasket sealing joint between the cylindrical socket and the cylindrical spigot. The spigot outwardly projecting portion is preferably a spigot ring welded to the spigot. A bearing snap-ring assembly locks the cylindrical socket against separation from the cylindrical spigot. The ring assembly includes a bearing snap-ring which bears between the cylindrical socket and the outwardly projecting portion fixed to the cylindrical spigot. The snap-ring is split to provide two ends from which extend two transverse pieces parallel to the axis of the joint. Each piece is attached to one of the two ends of the snap-ring and extends out of the plane uniquely defined by the snap-ring. The snap-ring assembly includes a ring adjuster located outside of the plane defined by the snap-ring and adapted to adjustably constrain the snap ring by adjusting its diameter. The ring adjuster preferably includes two lugs, each lug attached to a corresponding one of the two transverse pieces at an end opposite the bearing ring. A threaded stud extends between the two lugs and supports two spreader nuts and two closure nuts.

An alternate embodiment of the present invention is realized by a pipe joint locked against axial separation by a readily accessible snap-ring assembly. The pipe joint comprises a cylindrical socket having an outwardly projecting portion, a cylindrical spigot extending into said cylindrical socket and having a spigot outwardly projecting portion, and a gasket sealing joint between the cylindrical socket and the cylindrical spigot. The spigot outwardly projecting portion is preferably a spigot ring welded to the spigot. An annular gland encircles the spigot outwardly projecting portion and the socket outwardly projecting portion and includes a spigot bering portion bearing against the spigot ring. A bearing snap-ring assembly locks the cylindrical socket against separation from the cylindrical spigot. The ring assembly includes a bearing snap-ring which bears between the outwardly projecting portion of the cylindrical socket and the annular gland bearing against the spigot ring fixed to the cylindrical spigot. The snap-ring is split to provide two ends from which extend two transverse pieces parallel to the axis of the joint. Each piece is attached to one of the two ends of the snap-ring and extends out of the plane uniquely defined by the snap-ring. The snap-ring assembly includes a ring adjuster outside of the plane defined by the snap-ring and adapted to adjustably constrain the snap ring by adjusting its diameter. The ring adjuster preferably includes two lugs, each lug attached to a corresponding one of the two transverse pieces at an end opposite the bearing ring. A threaded stud extends between the two lugs and supports two spreader nuts and two closure nuts.

BRIEF DESCRIPTION OF THE DRAWINGS

These and other features of the present invention and the attendant advantages will be readily apparent to those having ordinary skill in the art and the invention will be more easily understood from the following detailed description of the preferred embodiments of the present invention taken in conjunction with the accompanying drawings wherein like reference characters represent like parts throughout the several views.

FIG. 1 and FIG. 2 represent cross-sectional views of prior art pipe joints.

FIG. 8 is a cross-sectional fragmentary view of a joint according to an alternate embodiment of the present invention.

DESCRIPTION OF THE PREFERRED EMBODIMENTS

Figure 3:
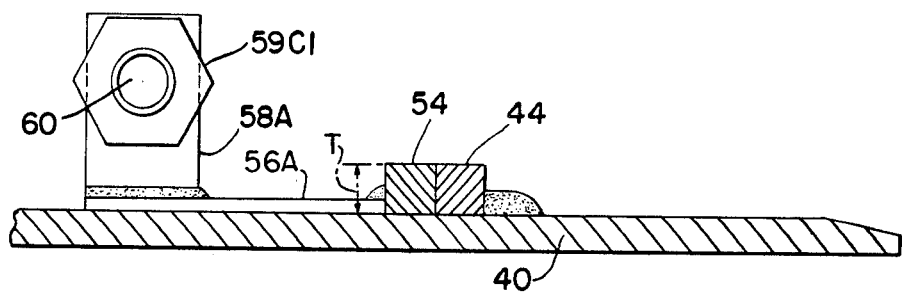
FIG. 3 is a cross-sectional fragmentary view of the spigot end of a pipe and a snap-ring in position ready for assembly into a bell end of a pipe to form a joint in accordance with the present invention.

Referring to the drawings, FIG. 1 shows in cross-section a particular type of an axially restrained pipe joint known to the prior art. The spigot end of pipe 10 is inserted within the bell end of pipe 12 with gasket 16 sealing the joint. Gasket 16 may be the double sealing action gasket of the aforenoted MacKay patent, 2,991,092. A spigot ring 14 is welded or otherwise adhered to the spigot end pipe 10 as shown. Bell end 12 may include radially spaced through holes adapted to receive locking bolts which extend from a collar piece 15 so that the socket or bell end 12 is axially restrained by T-head bolts 18.

Pressure is applied through nuts 17 which when threaded along threads 19 cause collar 15 and bell end 12 to be drawn toward each other, the position of collar 15 being limited by spigot ring 14.

FIG. 2 shows a prior art arrangement similar to that of FIG. 1 except that the bell end of pipe 22 may rotate more freely relative to the spigot end of pipe 20. Those parts of the pipe joint of FIG. 2 which have corresponding parts in FIG. 1 are numbered by the FIG. 1 number plus 10. Collar piece 25 is caused to bear against spigot ring 24 by adjustment of nut 27 on stud 28 and a second nut threaded on the other end of the stud as shown. A bell or socket ring 30 is welded to the bell end of pipe 22 and bears against bell collar 32. Gasket 26 corresponds to the gasket 16 of FIG. 1. This structure permits limited rotation of the bell end relative to the spigot end.

Figure 4:
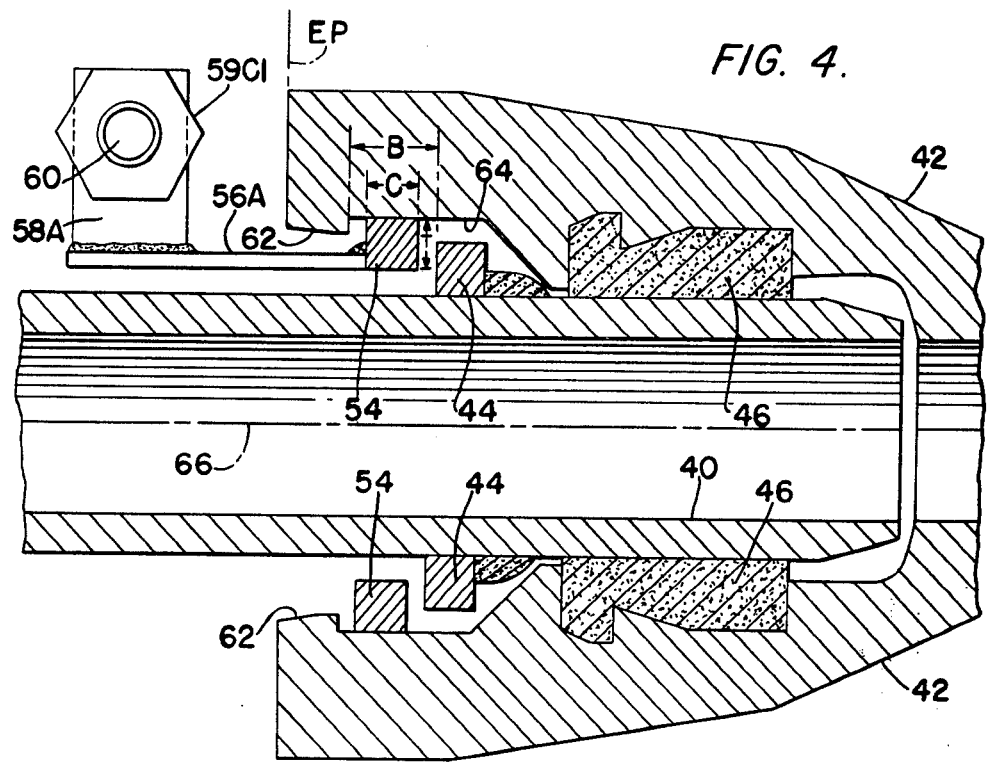
FIG. 4 is a cross-sectional fragmentary view of a joint according to the present invention.

FIGS. 3 and 4 illustrate a joint in accordance with the present invention. As shown in FIG. 3, a spigot 40 (representing the spigot end of a pipe) has welded or otherwise secured thereto a spigot ring 44, rectangular in cross-section, which preferably extends completely around the spigot 40. While the spigot ring 44 will usually extend circumferentially around the spigot 40, with its flat engaging surface positioned to lie flat against the spigot surface, in specific cases it may be desirable to have the spigot ring 40 positioned at an angle with respect to the circumference of spigot 40 as will be discussed below with reference to FIG. 6. As shown in FIG. 3, snap-ring 54 is positioned to extend in a circumference around spigot 40 adjacent to the spigot ring 44 as shown. Snap-ring 54 is split so that its natural resiliency causes the two ends to spread slightly, thus expanding the ring. Attached to each end of the split snap ring 54 is a transverse piece 56 which extends outwardly therefrom and which has affixed thereto by welding or the like an outwardly extending lug 58. Lug 58 is provided with a drilled hole through which is threaded stud 60. Attached to opposite ends of threaded stud 60 are closure nuts 59.

Figure 5:
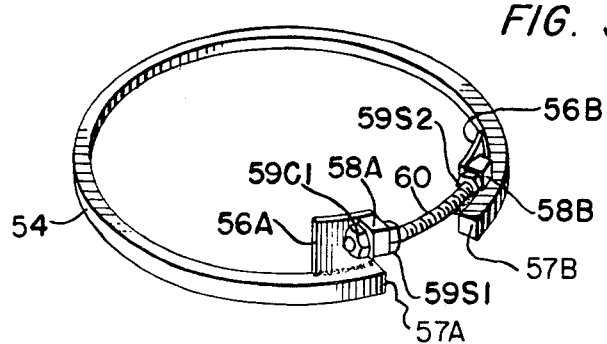
FIG. 5 is a perspective view of a snap-ring assembly of the present invention.

Turning momentarily to the perspective view of FIG. 5, the construction of the split snap-ring assembly will be more readily apparent. As shown, the snap ring assembly includes a square split ring 54 with two ends 57A and 57B formed at the split. Extending from each end 57A, and 57B substantially parallel to the axis of the joint to be restrained are corresponding transverse pieces 56A and 56B. Lugs 58A and 58B are welded respectively to transverse piece 56A and transverse piece 56B and extend outwardly therefrom. The threaded stud 60 is engaged in drilled holes in the lugs 58A and 58B and extends beyond the lugs to receive a closure nut 59C1 and 59C2 at each end. The two closure nuts 59C1 and 59C2 allow one to decrease the diameter of the snap ring 54. Threaded on stud 60 between lugs 58A and 58B are two spreader nuts 59S1 and 59S2. The two spreader nuts 59S1 and 59S2 allow one to increase the diameter of the snap-ring. Note that although FIG. 5 shows stud 60 as being curved, this is an alternate construction. In the preferred form stud 60 is straight as indicated by the absence of curved phantom lines in FIGS. 3 and 4.

Turning back to FIG. 3, it will be noted that the two closure nuts 59C1 and 59C2 have been adjusted such that snap-ring 54 is compressed, reducing its diameter slightly so that the inward flat surface of ring 54 contacts the outer surface of spigot 40 substantially around the entire circumference of spigot 40. In this position the bearing snap-ring asssembly including its snap ring 54, transverse pieces 56A and 56B, lugs 58A and 58B, stud 60, nuts 59C1, 59C2, 59S1, and 59S2 are in the position for allowing the socket to be mounted to the spigot 40.

Referring to FIG. 4, the restrained pipe joint of the present invention is illustrated with the socket 42 being placed around spigot 40. To assemble the joint, socket 42 is slid onto the end of spigot 40. It will be readily understood that socket 42 may include a gasket 46 installed as disclosed in the aforenoted MacKay patent. It will further be understood that socket 42 may be one end of a pipe having a spigot at its other end, whereas the spigot 40 may include a socket at its end which is not shown. Only a fragmentary section is shown for simplicity. Typically the pipe may have a diameter in the order of 24 inches and a length of several feet.

After spigot 40 has been inserted into the cavity of socket 42 with its end passing beyond gasket 46 and its exterior surface in sealing engagement with gasket 46, the closure nuts 59C1 and 59C2 may be loosened such that snap ring 54 will expand radially outwardly from its position in FIG. 3 to that shown in FIG. 4. If desired, one may caulk the snap-ring into its final position in the assembled joint as shown in FIG. 4 after the closure nuts 59 are released to the ends of the stud 60. Further, spreader nuts 59S1 and 59S2 may be adjusted to push lugs 59A and 59B apart thereby increasing the diameter of split snap-ring 54 and insuring contact between snap ring 54 and a retaining groove 64 within the socket cavity formed by the inside contours of socket or bell 42. This feature is advantageous in that bell 42 and socket cavity including retaining groove 64 may be slightly out-of-round due to present manufacturing methods. Also, snap-ring 54 may be rolled or cast slightly out-of-round. The end of socket 42 includes a radially inwardly projecting lip portion 62 which in combination with the radially outwardly projecting portion or spigot ring 44 of spigot 40 will prevent the socket 42 from separating from spigot 40. In particular, the application of an axial separating force to either socket 42 or spigot 40 will cause snap ring 54 to bear between and against the inside surface of inwardly projecting lip 62 and the vertical surface of outwardly projecting spigot ring 54. As shown, the lip portion 62 of socket 42 may be tapered or inclined slightly radially outward to facilitate the slipping of socket or bell 42 over the spigot ring 44 and snap ring 54.

The thickness T of snap ring 54 may be the same as the thickness of spigot ring 44 as shown in FIG. 3 and is less than the difference between the smallest inner radius of the cylindrical socket at its lip portion and the outer radius of the cylindrical spigot 40. This relationship in the dimensions of the parts is necessary to allow socket 42 to freely slide onto spigot 40. Similarly, the smallest inner diameter of the cylindrical socket at its inwardly projecting lip portion must be greater than the outer diameter of the spigot ring.

Although the spreader nuts 59S1 and 59S2 may be used for insuring contact between the snap ring and the retaining groove 64, it is preferable if the natural outside diameter of the split ring is larger than the inside diameter of the retaining groove 64 in the cavity of the cylindrical socket. The natural outside diameter of the split snap ring 54 is defined as that outside diameter which the snap ring will assume when unconstrained by the ring adjuster comprising lugs 58A and 58B, stud 60, and nuts 59C1, 59C2, 59S1, and 59S2. By making the natural outside diameter of the snap ring larger than the inside diameter of the cylindrical socket 42 at its retaining groove 64, one insures that the stripping of the threaded on stud 60 or the loss of stud 60 will not cause the snap ring 54 to slip out of its locking position. That is, snap ring 54 will maintain contact with the retaining groove 64 by virtue of its own resiliency.

The preferred assembly of the locked pipe joint of FIG. 4 may be summarized as follows:

1. The snap-ring assembly should be assembled snugly onto the spigot as shown in FIG. 3. A small hammer may be used to tap the ring substantially flush with the spigot ring prior to assembly.
2. Clean and lubricate spigot and socket surfaces as per normal assembly procedure.
3. Assemble the joint in essentially straight alignment as per normal procedure till the spigot contacts the rear of the socket. At this point, the spigot ring and snap-ring assembly should have disappeared inside the socket.
4. Loosen the outside nuts on the closure assembly to the end of the studs to allow the snap-ring to spread out against the inside of the socket. One may caulk at intervals around the joint with a caulking iron, chisel or other flat tool till the ring obviously snaps into the ring retaining groove of the socket. This should be noticeable as an obvious spreading of the ring struts on the closure stud.
5. Make sure the snap-ring is correctly seated in the socket by visual observation and/or inspection with a feeler gauge.
6. Tighten the inside nuts on the closure stud out firmly against the ring struts to insure intimate and positive contact of the snap-ring in the socket groove. Excessive torque on the inside nuts which might result in bending of the ring ends or closure assembly is not required.

In addition to axial separating forces parallel to center line 66, internal or external forces may deflect the axis of spigot 40 relative to the axis of socket 42. It is therefore necessary that the joint respond to these internal or external forces. For the pipe point of FIG. 4 the amount of deflection the joint can achieve in installation is approximately equal to the arctangent of the measure of movement the spigot may have in relation to the socket after the spigot is pushed as far as it will go into the socket in straight alignment and divided by the median diameter A of the assembled snap ring. The allowable deflection will be approximately as follows:

Deflection = Arctan ((B−C)/A).

wherein B represents the distance shown between the edge of spigot ring 44 and the edge of separating lip 62, A represents the median diameter of the snap ring 54 in its assembled (locked) position, and C is the width of the snap-ring 54.

Figure 6:
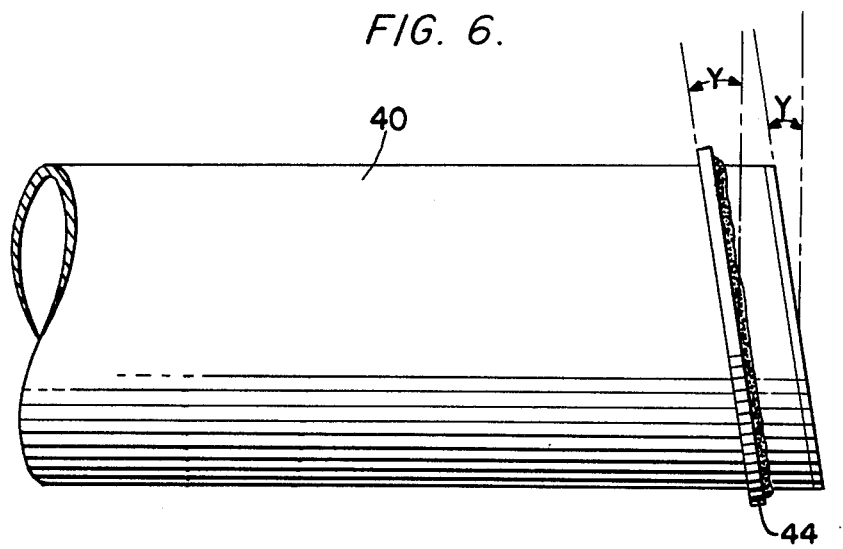
FIG. 6 is a fragmentary view of a spigot end of a pipe and spigot ring illustrating a modified embodiment of a spigot end of the present invention to furnish determinate joint deflection in the snap-ring joint.

Should more deflection be desired than is allowed by the above equation, a determinate amount of deflection might be achieved by welding the spigot ring onto the spigot at a prescribed angle Y to the pipe axis as shown in FIG. 6. Depending on the configuration of the rear of the gasket socket (not shown in FIG. 6), it may or may not be desirable to bevel the fitting end of spigot 40 to be parallel to the spigot ring 44.

Referring again to FIG. 4, a unique aspect in the ralationship between the snap ring 54 and the ring adjuster comprising lugs 58A and 58B, stud 60, and nuts 59C1, 59C2, 59S1 and 59S2, will be discussed. Snap ring 54 defines a ring plane of width C, which plane will be substantially perpendicular to center line 66. Additionally, socket 42 defines an end plane EP, which plane will also be substantially perpendicular to center line 66. Noting that anything to the right of the end plane EP as viewed in FIG. 4, may be considered as axially within the socket 42 and that anything to the left of end plane EP, as viewed in the drawing, is axially outside of socket 42, it will be readily appreciated that the ring adjuster comprising lugs 58A and 58B, stud 60, and nuts 59C1, 59C2, 59S1, and 59S2 is axially outside of socket 42. Additionally, it will be readily appreciated that the use of transverse pieces 56A and 56B makes this feature possible as well as allowing for the ring adjuster to be outside of the ring plane defined by the dimension C of snap ring 54. Note also that the socket 42 and spigot 40 have only continuous annular internal and external contours, the socket 42 and spigot 40 containing no bolt holes, lugs, slots, windows, holes, or other annular discontinuities.

Figure 7:
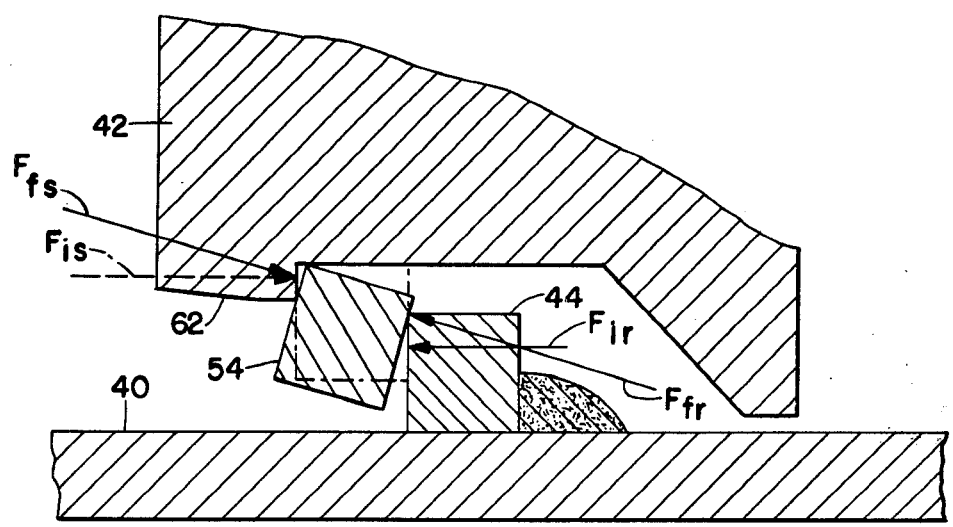
FIG. 7 is a cross-sectional fragmentary view of a joint illustrating the rotation of the snap-ring of the present invention in response to a great joint separating force.

Turning now to FIG. 7, the response of the pipe joint of FIG. 4 to a great joint separating force will be discussed. Specifically, FIG. 7 shows in partial cross-section spigot 40, socket 42, spigot ring 44, and snap ring 54. Upon initial application of axial separating forces, the snap ring, which is square in cross-section as shown, will assume the dotted position squarely in contact with the lip 62 and the spigot ring 44. Because of the radial offset between the initial separating force $F_{is}$ and the initial retaining force $F_{ir}$, the application of additional external or internal axial separating forces will cause the square cross-section snap ring 54 to rotate slightly in response to the force couple created by this radial offset. As the snap ring 54 rotates, it wedges itself securely between the inwardly projecting lip portion 62 and the spigot ring 44. Consequently and as shown, a substantial radial component of force is realized, resulting in circumferential tensile stresses in the pipe socket and circumferential compressive stresses in the pipe spigot. Thus, the weld 44W used to attach the spigot ring 44 to the spigot is not subjected to direct shear, nor is the relatively shallow lip portion 62 of the pipe socket 42 subjected to direct shear. Instead of acting in direct shear, the stresses are transferred to the relatively more massive pipe spigot and socket sections. The strength of the joint is therefore increased. The ability of the relatively flexible square snap ring to rotate differing amounts responsive to force loads also allows this joint to maintain line contact with the socket 42 and the spigot ring 44 over much of its circumference when the pipe joint is held in a slightly deflected position by an external force (such as soil reaction) and subjected to the joint separating actions of internal or external forces.

Turning now to FIG. 8, an alternate embodiment of the present invention, which facilitates rotation and strength in the deflected position, is shown in cross-sectional fragmentary view. The parts of the pipe joint which are located adjacent center line 166 are shown broken-away from the top and bottom parts. The reference characters used to identify the parts of FIG. 8 are in the 100 series with the tens unit corresponding to the similar part in FIG. 4. For example, spigot 140, socket 142, and gasket 146 correspond respectively to spigot 40, socket 42, and gasket 46 in the FIG. 4 pipe joint.

The spigot 140, spigot ring 144, weld bead 144W, and gasket 146 are identically constructed with the corresponding parts of the pipe joint shown in FIG. 4 embodiment and, thus, will not be described in detail. The bell 142 of FIG. 8 differs from the bell 42 of FIG. 4 in that it avoids use in its socket of an inwardly projecting lip portion 62 and retaining groove 64. Instead, the bell 142 includes an annular rim having an outwardly projecting portion 180 fixed to the cylindrical bell 142 and having side surfaces 182 and 184 substantially perpendicular to the pipe axis 166, and an annular slanted surface 183 closely adjacent the other surface of spigot 140. Surface 183 forms an opening which gradually diminishes in its diameter in the direction of left to right as viewed in the drawing, i.e., going from the outside of the rim inward toward the gasket 146.

An annular gland 170 surrounds the rim and includes a radially inwardly projecting lip portion 172 adjacent one end and a retaining groove 174. Retaining groove 174 is bounded on its sides by a first side wall 173 which preferably is perpendicular to the pipe axis 166 and a side of a gland centering stepped portion 185. Projecting inwardly from stepped portion 185 is a second side wall surface 176. Surface 176 tapers away from groove 174 into surface 177 which cooperates with spigot ring 144 and defines a gland radius of rotation. Surface 177 is cylindrical by curved about axis 166 and its cross-section taken in any place extending through center line 166 is curved with a radius of curvature 186R centered at point 186 which is the intersection of a plane which passes through the front of the retaining groove in the socket. As shown in FIG. 8, the plane does not pass through the gasket, but the plane is perpendicular to center line 166. This curvature for surface 177 will facilitate good deflection performance. The surface 174 extends from surface 176 to a side surface 178 a radially inwardly projecting lip portion 179.

Disposed between the side surface 182 of socket outwardly projecting portion 180 and side surface 173 of radially inwardly projecting gland lip portion 172 is a bearing ring 154 corresponding in construction to the bearing ring 54 of embodiment shown in FIG. 4. Moreover, the bearing ring 154 is part of a ring assembly also including a transverse connecting strap 156A, a lug 158A, a closure nut 195C1, and a threaded stud 160 as well as additional parts not shown in FIG. 8. The stud 160 could be either straight or curved. It will be readily understood that the additional parts not shown in FIG. 8 correspond to the part of the snap-ring assembly shown in FIG. 5. Details of these parts are omitted for simplicity inasmuch as the same construction snap-ring may be used for these parts of the pipe joint shown in FIG. 8 as the pipe joint shown in FIG. 4. Of course, it will be apparent that the diameter of the snap-ring 154 may be different to accomodate the retaining groove 174 inside diameter instead of the retaining groove 64 inside diameter of FIG. 4.

Although the operation of the pipe joint shown in FIG. 8 is readily apparent from the description given in connection with FIG. 4, this operation will be briefly summarized. Gland 170 is slid onto spigot 140, on which the spigot ring 144 may be welded as by a one pass weld bead. The two closure nuts (only nut 159C1 is visible in FIG. 8) are used to tighten the snap-ring 154 to rest on the outside of socket 142 immediately adjacent to the socket outwardly projecting portion 180. The socket 142 and attached snap-ring 154 are then slid onto the spigot 140 with the gasket 146 installed in a well known manner. It should be noted that the smallest inner diameter of the inwardly projecting lip portion 172 of gland 170 is greater than the outer diameter of the socket outwardly projecting portion 180 in order to allow socket 146 and ring 154 to be slid behind the lip 172. Further, the bearing or snap ring 154 has a radial thickness less than the difference between the smallest inner radius of the inwardly projecting lip portion 172 and the largest outer radius of the cylindrical socket 142 except for the outer radius of the outwardly projecting portion 180, this dimensional relationship also being useful to facilitate easy assembly of the present invention.

The annular outwardly projecting portion 180 of socket 142 and the snap-ring 154 will now be disposed radially inwardly from the retaining groove 174 in the gland 170. In order to lock the pipe joint, the closure nuts on the snap-ring assembly may be loosened to allow the snap ring 154 to assume its natural diameter which preferably will be somewhat greater than the inner diameter of the retaining groove 174. The snap-ring 154 will thus bear against the retaining groove 174. Further, the spreader nuts (not shown in FIG. 8) may be used to increase the bearing force and ensure intimate contact between snap-ring 154 and retaining groove 174.

The operation of the snap-ring 154 in a condition of great axial separation force will be essentially similar to that shown for bearing ring 54 in FIG. 7. One will readily appreciate that lip 172, retaining groove 174 and outwardly projecting portion 180 function in essentially the same manner as lip 62, retaining groove 64, and spigot ring 44 respectively. The bearing snap ring 154 bears between side surface 173 and the side of stepped portion 185 in similar fashion to bearing snap ring 54 bearing between the side of lip portion 62 and the side of spigot ring 44. However, the operation of the FIG. 8 pipe joint is somewhat more advantageous and specialized than the FIG. 4 pipe joint in that the annular gland 170, which will be prevented from separating from spigot 140 by the virtue of spigot ring 144, facilitates relative rotation between the spigot 140 and socket 142 more efficiently than the FIG. 4 pipe joint. Further, this pipe joint is quite well suited to allowing a limited angular deflection between the axes of adjacent pipe sections. Although the drawing of FIG. 8 shows the spigot 140 and socket 142 as being co-axial, soil reaction or other external conditions may cause a limited angular deflection such that adjacent pipe sections are not exactly co-axial. The structure of the FIG. 8 pipe joint, especially including slanted surfaces 177 and 183, is especially well suited for accomodating these angular deflections and yet maintaining substantial strength in the deflected position. The surfaces 177 and 183 are slanted in that their cross-section of FIG. 8 is not a line parallel to axis 166. Surfaces 179 and 183 are also slanted (i.e., their cross section lines in FIG. 8 are not parallel to axis 166) to allow slight angular deflections between the gland 170 and spigot 140 and between the socket 142 and spigot 140. If desired, additional determinate deflection between the spigot 140 and socket 142 may be provided by welding spigot ring 144 onto spigot 140 at an angle in the manner of spigot ring 44 in FIG. 6.

It should be noted that the bearing ring 154 uniquely defines a plane (perpendicular to axis 166 and having a small thickness along axis 166) and has two transverse pieces 156A and 156B (156B is not visible in FIG. 8) which extends away from the plane defined by the bearing ring 154 to a position outside of the gland 170. That is, the transverse pieces 156A and 156B extend past the end plane EP' to allow easy ring diameter adjustment by the closure and spreader nuts. The ring adjuster including the closure and spreader nuts is axially (i.e., along line 166) outside of the end plane EP' uniquely defined by the end of the gland 170. It should also be noted, that the cylindrical spigot 140, cylindrical socket 142, and annular gland 170 have only continuous annular internal and external contours.

Comparing FIG. 4 and the FIG. 8 both illustrated embodiments use a bearing ring retaining portion which may be a part of the socket 42 (FIG. 4) or part of the annular gland 170 (FIG. 8). The retaining portion 42R (FIG. 4) of socket 42 includes retaining groove 64 and lip portion 62, whereas the retaining portion 170R (FIG. 8) of gland 170 includes retaining groove 174 and lip portion 172.

The many advantages of the present invention over the prior art should be readily apparent. Specifically, the present invention provides for a great versatility and applicability in the layout and installation of pipes in ductile iron pipe lines. Furthermore, the present invention provides for a socket pipe joint having the advantage of simplicity of design and installation and high strength which allows stresses to be transferred to massive pipe sections rather than being applied directly to welds and lips. In particular and unlike much of the prior art, the assembly and disassembly of the present pipe joint will not require a lifting machine to handle and install the restraining component(s) of large diameter pipes and fittings. Further the cost of manufacturing and installation is quite low for the present invention, while additionally being capable of withstanding larger separating forces.

Although the present invention is useful with pipes of many different materials, the present invention is especially well suited for use with ductile iron pipes. The snap ring assembly including the snap ring, transverse pieces, lugs, stud, and nuts may preferably be made of a low alloy corrosion resistant steel.

The present invention is not limited to the exact structures shown, but is capable of a variety of mechanical embodiments. Various changes which would now suggest themselves to those skilled in the art may be made in the structural details of the present invention without departing from the inventive concept. Accordingly, the scope of the present invention should be determined by reference to the appended claims.

What is claimed is:

1. A pipe joint restrained against axial separation comprising:
   a first pipe having a cylindrical socket;
   a second pipe having a cylindrical spigot extending into said cylindrical socket and including an outwardly projecting portion;
   a gasket sealing the joint between the cylindrical spigot and the cylindrical socket;
   a bearing ring retaining portion;
   a ring assembly having a first part positioned within said retaining portion and a second part positioned outside of said retaining portion, said first part including a bearing ring having two ends at a split, and said bearing ring being positioned between the retaining portion and one of said first and second pipes, said bearing ring uniquely defining a plane, two transverse pieces connecting said first part to said second part, each said transverse piece being attached to one of the two ends of said bearing ring and extending away from the plane defined by said bearing ring to a position outside of said retaining portion;
   said second part including a ring adjustor, said ring adjustor located outside of the plane defined by the bearing ring and adapted to adjustably constrain the bearing ring by allowing adjustment of the diameter of the bearing ring; and
   further including an annular gland, and wherein said socket includes an outwardly projecting portion, said annular gland encircling said socket outwardly projecting portion and said spigot outwardly projecting portion, said annular gland including a spigot bearing portion bearing against said spigot outwardly projecting portion, and said retaining portion is part of said annular gland and said bearing ring bears between said retaining portion of said annular gland and said socket outwardly projecting portion.

2. The pipe joint of claim 1 wherein said bearing ring is a snap ring, said retaining portion includes an annular retaining groove, said bearing ring is seated in said retaining groove, said snap ring has a natural outside diameter when unconstrained by said ring adjustor, and said natural outside diameter is larger than the inside diameter at said retaining groove.

3. The pipe joint of claim 1 wherein said gland further includes a radially inwardly projecting lip portion and a retaining groove and said bearing ring bears between said socket outwardly projecting portion and said inwardly projecting lip portion of said gland, said bearing ring disposed in said retaining groove in said gland.

4. The pipe joint of claim 3 wherein said socket outwardly projecting portion is annular, and the smallest inner diameter of said inwardly projecting lip portion of said gland is greater than the outer diameter of said socket outwardly projecting portion.

5. The pipe joint of claim 4 wherein said bearing ring is a snap-ring having a thickness less than the difference between the smallest inner radius of said inwardly projecting lip portion and the largest outer radius of said cylindrical socket except for the outer radius of said socket outwardly projecting portion.

6. The pipe joint of claim 5 wherein the natural outside diameter of said snap-ring when unconstrained by said ring adjustor is larger than the inside diameter of said gland at its retaining groove.

7. The pipe joint of claim 1, 4, or 6 wherein said bearing ring is a snap-ring having a thickness less than the difference between the smallest inner radius of said inwardly projecting lip portion of said socket and the largest outer radius of said cylindrical socket except for the outer radius of said socket outwardly projecting portion and the ring adjustor includes two lugs, each lug attached to a corresponding one of the two transverse pieces at an end opposite the bearing ring, and a threaded stud extending between the two lugs.

8. The pipe joint of claims 1, 4 or 6 wherein said ring adjustor is axially outside of an end plane uniquely defined by the end of said gland.

9. The pipe joint of claims 1, 4 or 6 wherein said cylindrical socket, said cylindrical spigot, and annular gland have only continuous annular internal and external contours.

10. A pipe joint of claim 6 wherein the ring adjustor includes two lugs, each lug attached to a corresponding one of the two transverse pieces at an end opposite the bearing ring, and a threaded stud extending between the two lugs, and said ring adjustor is axially outside of an end plane uniquely defined by the end of said gland, and said cylindrical socket, said cylindrical spigot, and annular gland having only continuous annular internal and external contours.

11. The pipe joint of claim 1 wherein said bearing ring is a snap-ring having a thickness less than the difference between the smallest inner radius of said inwardly projecting lip portion of said socket and the largest outer radius of said cylindrical socket except for the outer radius of said socket outwardly projecting portion and the ring adjustor includes two lugs, each lug attached to a corresponding one of the two transverse pieces at an end opposite the bearing ring, and a threaded stud extending between the two lugs.

12. The pipe joint of claim 11 wherein said ring adjustor includes first and second spreader nuts on said threaded stud, and a first and second closure nuts on said threaded stud.

13. The pipe joint of claim 11 wherein said snap-ring is rectangular in cross-section and has side surfaces bearing between said socket outwardly projecting portion and said inwardly projecting lip portion of said gland and wherein the application of axial forces tending to separate said cylindrical socket from said cylindrical spigot causes the snap-ring to rotate and wedge itself securely between said socket outwardly projecting portion and said inwardly projecting lip portion of said gland.

14. The pipe joint of claim 1 wherein said bearing ring is a snap-ring rectangular in cross-section and bearing between cooperating surfaces of said socket outwardly projecting portion and said inward projecting lip portion of said annular gland and wherein the application of axial forces tending to separate said cylindrical socket from said cylindrical spigot causes the snap-ring to rotate and wedge itself securely between said inward projecting lip portion of said annular gland and said socket outwardly projecting portion.

15. The pipe joint of claim 14 wherein said ring adjustor includes a threaded rod, a first spreader nut on said threaded rod, said first spreader nut being operable to expand the diameter of said snap-ring and a first closure nut on said threaded rod, said first closure nut being operable to contract the diameter of said snap-ring.

16. The pipe joint of claim 15 said snap ring adjustor further includes a second spreader nut on said threaded rod, said second spreader nut being operable to expand the diameter of said bearing ring, and said ring adjustor further includes a second closure nut on said threaded rod, said second closure nut being operable to contract the diameter of said bearing ring.

17. The pipe joint of claim 16 further comprising a lug on each of said two transverse pieces and said threaded rod extends between the two lugs.

18. A pipe joint restrained against axial separation comprising:
- a first pipe having a cylindrical socket and an outwardly projecting portion;
- a second pipe having a cylindrical spigot extending into said cylindrical socket and including an outwardly projecting portion;
- a gasket sealing the joint between said cylindrical socket and said cylindrical spigot;
- an annular gland encircling said socket outwardly projecting portion and said spigot outwardly projecting portion, said annular gland including a spigot bearing portion bearing against said spigot outwardly projection portion and a radially inward projecting lip portion between an end of said annular gland and a retaining groove in said annular gland; a snap-ring having two ends at a split, said snap-ring disposed to push radially out against said retaining groove and positioned between said socket outwardly projecting portion and said radially inward projecting lip portion;
- two transverse pieces, each transverse piece mounted to one of said two snap-ring ends and extending away from a plane defined by the snap-ring to a position outside of said annular gland; and
- a ring adjustor mounted to said transverse pieces outside of said annular gland; wherein said ring adjustor locks said pipe joint against axial separation by allowing said snap-ring to expand and push radially out against said retaining groove and with an inner diameter surface of said snap-ring separated from any other surfaces.

19. The pipe joint locking assembly of claim 18 whereinsaid snap-ring has a thickness less than the difference between the smallest inner radius of said retaining groove and the largest outer radius of said cylindrical socket except at said socket outwardly projecting portion.

20. The pipe joint locking assembly of claim 19 wherein said snap-ring is rectangular in cross-section and has side surfaces bearing between said socket outwardly projecting portion and said inwardly projecting lip portion of said gland and wherein the application of axial forces tending to separate said cylindrical socket from said cylindrical spigot causes the snap-ring to rotate and wedge itself securely between said socket outwardly projecting portion and said inwardly projecting lip portion of said gland.

21. The pipe joint locking assembly of claim 20 wherein said ring adjustor includes two lugs, each lug attached to a corresponding one of the two transverse pieces at an end opposite the snap-ring, a stud extending between the two lugs, two spreader nuts on the stud and being operable to expand the diameter of said snap-ring, and two closure nuts on the stud and being operable to contract the diameter of said snap-ring.

22. The pipe joint of claim 18 wherein said ring adjustor includes a threaded rod, a first spreader nut on said threaded rod, said first spreader nut being operable to expand the diameter of said snap-ring and a first closure nut on said threaded rod, said first closure nut being operable to contract the diameter of said snap-ring.

23. The pipe joint of claim 22 wherein said snap-ring is rectangular in cross-section and bears between cooperating surfaces of said socket outwardly projecting portion and said inward projecting lip portion of said annular gland and wherein the application of axial forces tending to separate said cylindrical socket from said cylindrical spigot causes the snap-ring to rotate and wedge itself securely between said inward projecting lip portion of said annular gland and said socket outwardly projecting portion.

* * * * *